(12) United States Patent
Katsura (10) Patent No.: US 11,535,005 B2
(45) Date of Patent: Dec. 27, 2022

(54) FUNCTIONAL LAMINATE AND PRODUCTION METHOD THEREFOR

(71) Applicant: MAZDA MOTOR CORPORATION, Hiroshima (JP)

(72) Inventor: Daiji Katsura, Etajima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 332 days.

(21) Appl. No.: 16/498,335

(22) PCT Filed: Feb. 16, 2018

(86) PCT No.: PCT/JP2018/005547
§ 371 (c)(1),
(2) Date: Sep. 26, 2019

(87) PCT Pub. No.: WO2018/179978
PCT Pub. Date: Oct. 4, 2018

(65) Prior Publication Data
US 2020/0023610 A1     Jan. 23, 2020

(30) Foreign Application Priority Data
Mar. 31, 2017   (JP) .............................. JP2017-072518

(51) Int. Cl.
*B32B 5/24*      (2006.01)
*B32B 5/02*      (2006.01)
(Continued)

(52) U.S. Cl.
CPC .............. *B32B 5/245* (2013.01); *B32B 5/022* (2013.01); *B32B 5/26* (2013.01); *B32B 7/02* (2013.01);
(Continued)

(58) Field of Classification Search
CPC ........... B32B 5/245; B32B 5/022; B32B 5/26; B32B 7/02; B32B 37/02; B32B 37/15;
(Continued)

(56) References Cited

U.S. PATENT DOCUMENTS 5,460,873 A * 10/1995 Ogawa ...................... B32B 5/24
427/370
8,920,913 B2 * 12/2014 Rhee ................... H01M 50/491
428/220
(Continued)

FOREIGN PATENT DOCUMENTS

DE     102013104715 A1    11/2014
EP      0 555 476 A1       8/1993
(Continued)

OTHER PUBLICATIONS

JP H06171002 A Machine Translation.*
(Continued)

*Primary Examiner* — Travis M Figg
(74) *Attorney, Agent, or Firm* — Studebaker & Brackett PC (57) ABSTRACT

Provided is a functional laminate including a porous intermediate layer having air permeability laminated between a porous surface layer and a resin foamed layer, the porous intermediate layer having an affinity to a foaming resin forming the resin foamed layer.

8 Claims, 2 Drawing Sheets

(51) Int. Cl.
*B32B 5/26* (2006.01)
*B32B 7/02* (2019.01)
*B32B 37/02* (2006.01)
*B32B 37/15* (2006.01)

(52) U.S. Cl.
CPC .............. *B32B 37/02* (2013.01); *B32B 37/15* (2013.01); *B32B 2250/03* (2013.01); *B32B 2262/0284* (2013.01); *B32B 2262/101* (2013.01); *B32B 2266/0278* (2013.01); *B32B 2305/022* (2013.01); *B32B 2305/20* (2013.01); *B32B 2307/102* (2013.01); *B32B 2315/085* (2013.01); *B32B 2367/00* (2013.01); *B32B 2375/00* (2013.01); *B32B 2605/08* (2013.01); *B32B 2605/10* (2013.01)

(58) Field of Classification Search
CPC ........ B32B 2250/03; B32B 2262/0284; B32B 2262/101; B32B 2266/0278; B32B 2305/022; B32B 2305/20; B32B 2307/102; B32B 2315/085; B32B 2367/00; B32B 2375/00; B32B 2605/08; B32B 2605/10; B32B 7/022; B32B 5/18; B32B 5/19; B32B 5/20; B32B 5/21; B32B 5/22; B32B 5/266; Y10T 428/24942; D10B 2401/10
USPC .......................................................... 428/212
See application file for complete search history.

(56) References Cited

U.S. PATENT DOCUMENTS

| | | | | |
|---|---|---|---|---|
| 2005/0049323 | A1* | 3/2005 | Gvozdic | C08J 3/24 521/64 |
| 2006/0021823 | A1* | 2/2006 | Kohara | G10K 11/168 181/290 |
| 2009/0298374 | A1* | 12/2009 | Delmas | B32B 5/08 442/374 |
| 2011/0067949 | A1* | 3/2011 | Mori | B32B 5/28 181/198 |
| 2012/0301698 | A1* | 11/2012 | Rhee | B32B 27/36 428/220 |
| 2014/0273705 | A1* | 9/2014 | Lawrence | B32B 5/245 442/370 |
| 2014/0332313 | A1* | 11/2014 | Bischoff | B32B 27/065 181/290 |

FOREIGN PATENT DOCUMENTS

| | | | |
|---|---|---|---|
| JP | H04-141405 A | | 5/1992 |
| JP | H06-171002 A | | 6/1994 |
| JP | H06171002 A | * | 6/1994 ............. B29C 39/10 442/345 |
| JP | H08-142245 A | | 6/1996 |
| JP | 2990207 B2 | * | 12/1999 |
| JP | H06171002 A | * | 12/1999 |
| JP | 2000-062061 A | | 2/2000 |
| JP | 2002-275749 A | | 9/2002 |
| JP | 2005-144060 A | | 6/2005 |
| JP | 2005-288873 A | | 10/2005 |
| JP | 2009-534241 A | | 9/2009 |
| JP | 2011-148204 A | | 8/2011 |
| JP | 2014-531356 A | | 11/2014 |
| JP | 2015-138055 A | | 7/2015 |
| WO | 93/03904 A1 | | 3/1993 |
| WO | 2014/157080 A1 | | 10/2014 |

OTHER PUBLICATIONS

Shigeru et al. (JP H06/171002 A; machine translation) (Year: 1999).*

International Search Report issued in PCT/JP2018/005547; dated May 15, 2018.

* cited by examiner

FUNCTIONAL LAMINATE AND PRODUCTION METHOD THEREFOR

TECHNICAL FIELD

The present disclosure relates to a functional laminate and a production method therefor.

BACKGROUND ART

In recent years, many attempts have been made, in engine-equipped machines such as vehicles (such as automobiles, trucks, buses, and trains) and agricultural machines (such as mowers and cultivators), to absorb sounds emitted by engines.

In the field of automobiles in particular, in view of riding comfort for passengers, attempts are being made to absorb engine sounds by covering powertrain members including an engine and a transmission with a sound absorbing material. For the cover member, a urethane foam or a fiber nonwoven fabric is used alone, for example.

By the way, reported is an integrally foamed product including a latex foam thin layer directly applied to the inner surface of a fabric and a main body foam directly injected onto the inner surface, foamed, and cured as an integral foamed product such as a head rest, a seat, a seat back, or an arm rest (Patent Document 1). In such an integrally foamed product, the latex foam thin layer is mechanically connected to fibers on the inner surface of the fabric so as to embrace them in a region near the fabric to form a connected region and forms an air-permeable skin substantially preventing a main body foam raw liquid from entering on the outside.

Also reported is a foamed molded body in which a sheet member is integrated with the outer surface of a foamed molded main body as a foamed molded body such as a chair or cushion (Patent Document 2). In such a foamed molded body, the sheet member includes a laminate of a stretched porous film and a nonwoven fabric and has properties to allow gas to pass therethrough and to block liquid.

CITATION LIST

Patent Document

[Patent Document 1] WO 93/03904
[Patent Document 2] Japanese Unexamined Patent Publication No. 2011-148204

SUMMARY OF THE INVENTION

Technical Problem

The inventor of the present disclosure has applied the techniques about the foamed product or the foamed molded body to a cover member of powertrain members, for example, to find a new problem of insufficiently obtaining sound absorbability.

Given these circumstances, the inventor of the present disclosure has found out that even when foaming molding is performed in a mold in the presence of a glass fiber nonwoven fabric, for example, sound absorbability cannot still sufficiently be obtained.

It is an object of the present disclosure to provide a functional laminate more excellent in sound absorbability.

It is also an object of the present disclosure to provide a functional laminate more excellent in not only sound absorbability but also thermal insulating properties.

Solution to the Problem

The present disclosure relates to a functional laminate including a porous intermediate layer having air permeability laminated between a porous surface layer and a resin foamed layer, the porous intermediate layer having an affinity to a foaming resin forming the resin foamed layer.

Advantages of the Invention

A functional laminate of the present disclosure is more excellent in sound absorbability.
The functional laminate of the present disclosure is more excellent also in thermal insulating properties.
The functional laminate of the present disclosure is more excellent also in damping properties.

DESCRIPTION OF EMBODIMENTS

[Functional Laminate]

A functional laminate of the present disclosure relates to a laminate including at least sound absorbability; the functionality includes at least a piece of performance among sound absorbability, thermal insulating properties, damping properties, and the like.

Figure 1:
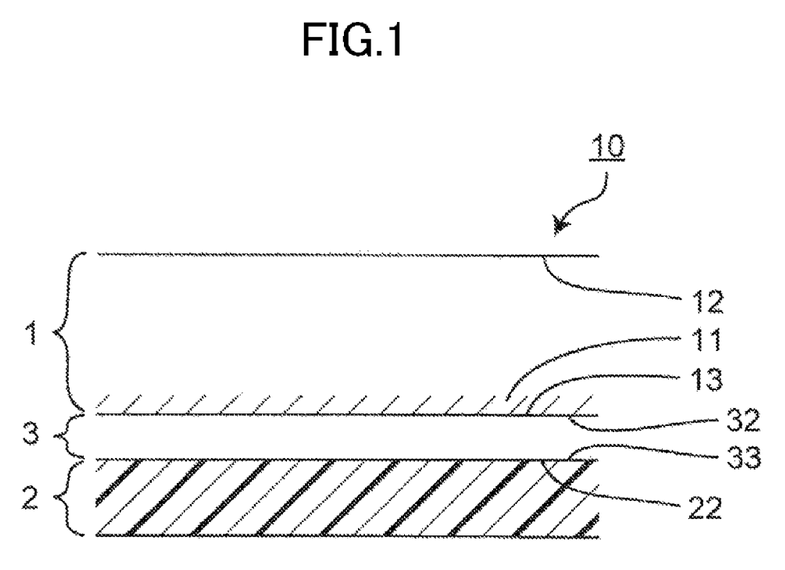
FIG. 1 illustrates a schematic sectional view of a functional laminate of the present disclosure.

As illustrated in FIG. 1, this functional laminate 10 of the present disclosure includes a specific porous intermediate layer 3 laminated between a porous surface layer 1 and a resin foamed layer 2, in which the porous surface layer 1, the resin foamed layer 2, and the porous intermediate layer 3 are connected and integrated together. As described below, the specific porous intermediate layer 3 has affinity to a foaming resin (a raw liquid) forming the resin foamed layer 2, and is thus likely to cause a capillary phenomenon and preferably more likely to cause the capillary phenomenon than the porous surface layer 1 is owing to the affinity. Consequently, before the foaming of the foaming resin (the raw liquid) forming the resin foamed layer 2, the porous intermediate layer 3 is likely to hold the foaming resin. Given these circumstances, the porous intermediate layer 3 moderately hinders the movement (impregnation) of the foaming resin into the porous surface layer 1 before foaming, and upon start of foaming, the foaming resin held by the porous intermediate layer 3 foams while permeating the porous surface layer 1. It is conceivable that, consequently, the amount of impregnation of the foaming resin into the porous surface layer 1 is moderately reduced, the foaming resin sufficiently foams, and thus sufficiently improving sound absorbability, thermal insulating properties, and damping properties (especially sound absorbability). When the porous intermediate layer is not limited, and when the porous intermediate layer has no affinity to the foaming resin, the movement of the foaming resin into the porous surface layer 1 excessively occurs before foaming, the foaming resin moves (is impregnated) into the porous surface layer in an excessive amount during foaming, and thus the foaming resin does not sufficiently foam within the porous surface layer. It is conceivable that, consequently, sound absorbability, thermal insulating properties, and damping properties are degraded. FIG. 1 illustrates a schematic sectional view of the functional laminate of the present disclosure.

The foaming resin forming the resin foamed layer 2 refers to a foaming resin (a raw liquid) used as a raw material of the resin foamed layer 2. When the resin foamed layer 2 is a polyurethane foamed layer, for example, the foaming resin is a mixture of a polyol compound and an isocyanate compound. The foaming resin may contain additives such as a foaming agent and a foam stabilizer.

In the present disclosure, the capillary phenomenon refers to a physical phenomenon about the behavior of the foaming resin (liquid) within voids of the porous intermediate layer 3 and the porous surface layer 1. The likelihood of the occurrence of the capillary phenomenon can be controlled by adjusting the affinity to the foaming resin included in the porous intermediate layer 3 and the porous surface layer 1. Specifically, the higher the affinity becomes, the more the capillary phenomenon is likely to occur.

(Porous Intermediate Layer)

The porous intermediate layer 3 has air permeability. The "air permeability" of the porous intermediate layer 3 is a characteristic exchangeable with "liquid permeability," that is, refers to a characteristic through which the porous intermediate layer 3 enables the foaming resin (liquid) to moderately pass therethrough during production of the functional laminate. The porous intermediate layer 3 has such air permeability, thus achieving integration of the porous surface layer 1, the resin foamed layer 2, and the porous intermediate layer 3. The air permeability of the porous intermediate layer 3 is specifically such air permeability that a mixed layer part 11 described below can be formed.

The porous intermediate layer 3 has an affinity to the foaming resin forming the resin foamed layer 2 (hereinafter, may be referred to simply as "affinity"). That the porous intermediate layer 3 has the affinity means that surfaces of voids of the porous intermediate layer 3 are likely to become compatible or likely to become wet with the foaming resin. That is to say, a contact angle $\theta m$ of the porous intermediate layer 3 relative to the foaming resin (hereinafter, may be referred to simply as "a contact angle $\theta m$") is normally 20° or less, preferably 1° to 20°, more preferably 1° to 15°, and even more preferably 1° to 10° in view of the likelihood of the occurrence of the capillary phenomenon in the porous intermediate layer and further improvement in the sound absorbability, the thermal insulating properties, and the damping properties of the functional laminate. The porous intermediate layer 3 has such affinity, and thus the porous intermediate layer 3 is likely to hold the foaming resin by the capillary phenomenon. For example, the higher the affinity of the porous intermediate layer 3 becomes, the smaller the contact angle $\theta m$ of the porous intermediate layer 3 becomes. For example, the lower the affinity of the porous intermediate layer 3 becomes, the larger the contact angle $\theta m$ of the porous intermediate layer 3 becomes.

The contact angle $\theta m$ of the porous intermediate layer 3 relative to the foaming resin refers to a contact angle of the foaming resin on a plane having a surface with a composition equivalent to that of the material forming the porous intermediate layer.

The affinity of the porous intermediate layer 3 is preferably higher than the affinity of the porous surface layer 1 in view of the likelihood of the occurrence of the capillary phenomenon in the porous intermediate layer and further improvement in the sound absorbability, the thermal insulating properties, and the damping properties of the functional laminate. The fact that the affinity of the porous intermediate layer 3 is higher than the affinity of the porous surface layer 1 means that the contact angle $\theta m$ of the porous intermediate layer 3 relative to the foaming resin is smaller than a contact angle $\theta s$ of the porous surface layer 1 relative to the foaming resin (hereinafter, may be referred to simply as "a contact angle $\theta s$"). The contact angle $\theta m(°)$ of the porous intermediate layer 3 relative to the foaming resin and the contact angle $\theta s(°)$ of the porous surface layer 1 relative to the foaming resin preferably satisfy Relational Expression (p1) below, more preferably satisfy Relational Expression (p2) below, even more preferably satisfy Relational Expression (p3) below, and most preferably satisfy Relational Expression (p4) below in view of the likelihood of the occurrence of the capillary phenomenon in the porous intermediate layer and further improvement in the sound absorbability, the thermal insulating properties, and the damping properties of the functional laminate.

$$1°\leq \theta s-\theta m \tag{p1}$$

$$1°\leq \theta s-\theta m \leq 30° \tag{p2}$$

$$3°\leq \theta s-\theta m \leq 20° \tag{p3}$$

$$5°\leq \theta s-\theta m \leq 20° \tag{p4}$$

The contact angles ($\theta m$ and $\theta s$) of the porous intermediate layer and the porous surface layer relative to the foaming resin are represented by values measured by the method bellow. Using a contact angle measurement apparatus G-1.2MG manufactured by Elmer Optics, propylene glycol monomethyl ether (PGM) was dropped onto a test piece, and a contact angle after 30 seconds is measured. For the test piece, a flat plate having a surface with a composition equivalent to that of the material forming the porous intermediate layer or the porous surface layer is used.

The material forming the porous intermediate layer is not limited to a particular material so long as it has the air permeability described above and has the affinity and may be a fiber nonwoven fabric or a polymer foam, for example. The following exemplifies specific examples of the fiber nonwoven fabric and the polymer foam intrinsically having the affinity without any treatment. When the porous intermediate layer formed of a material that does not intrinsically have the affinity is used, affinity treatment for imparting the affinity may be performed on the porous intermediate layer, and the one to which the affinity has been imparted may be used as the porous intermediate layer. $\theta$ shown together with specific examples below is a contact angle that a certain material intrinsically shows without any treatment and refers to a contact angle relative to the foaming resin measured by the method described above.

Specific examples of the fiber nonwoven fabric of the porous intermediate layer intrinsically having the affinity include nonwoven fabrics of one or more organic fibers selected from the group including polyester fibers such as polyethylene terephthalate (PET) fibers ($\theta=4°$). The fiber nonwoven fabric of the porous intermediate layer may be a nonwoven fabric of one or more inorganic fibers selected from the group including alumina fibers ($\theta=4°$). The fiber nonwoven fabric of the porous intermediate layer may be a nonwoven fabric of a fiber blend of organic fibers and inorganic fibers. Examples of the fiber nonwoven fabric of the porous intermediate layer that can be used with the affinity treatment performed thereon include nonwoven fabrics of organic fibers and/or inorganic fibers described below exemplified as a fiber nonwoven fabric of the porous surface layer.

For the polymer foam of the porous intermediate layer intrinsically having the affinity, one having an open-cell structure is used. Specific examples of such a polymer foam include polymer foamed layers selected from the group including a polyester foamed layer such as a PET foamed layer ($\theta=4°$). Examples of the polymer foam of the porous intermediate layer that can be used with the affinity treatment performed thereon include polymer foams described below and exemplified as a polymer foam of the porous surface layer.

The porous intermediate layer is preferably a fiber nonwoven fabric, more preferably a nonwoven fabric of PET fibers and/or alumina fibers, and even more preferably a nonwoven fabric of PET fibers in view of further improvement in the sound absorbability, the thermal insulating properties, and the damping properties of the functional laminate.

The porous intermediate layer 3 may have the affinity at least on a side facing the porous surface layer and preferably has the affinity in its entirety.

An average void ratio Rm (%) of the porous intermediate layer and an average void ratio Rs (%) of the porous surface layer preferably satisfy Relational Expression (x1) below, more preferably satisfy Relational Expression (x2) below, even more preferably satisfy Relational Expression (x3) below, and still even more preferably satisfy Relational Expression (x4) below in view of the likelihood of the occurrence of the capillary phenomenon in the porous intermediate layer and further improvement in the sound absorbability, the thermal insulating properties, and the damping properties of the functional laminate.

$$1.01 \leq Rs/Rm \tag{x1}$$

$$1.05 \leq Rs/Rm \leq 2.0 \tag{x2}$$

$$1.10 \leq Rs/Rm 1.5 \tag{x3}$$

$$1.15 \leq Rs/Rm \leq 1.3 \tag{x4}$$

The average void ratio Rm of the porous intermediate layer is normally 60 to 95% and preferably 65 to 90% in view of the likelihood of the occurrence of the capillary phenomenon in the porous intermediate layer and further improvement in the sound absorbability, the thermal insulating properties, and the damping properties of the functional laminate.

The average void ratio of the porous intermediate layer, when the porous intermediate layer is a fiber nonwoven fabric, refers to the volume ratio of voids formed among fibers, that is, the volume ratio of inter-fiber voids and is represented by a ratio measured by the method below. The nonwoven fabric of the porous intermediate layer impregnated with the foaming resin is cut out of the functional laminate, and the foaming resin is dissolved with an organic solvent that dissolves only the foaming resin among the fibers and the foaming resin which form the nonwoven fabric to obtain the fiber nonwoven fabric alone. The volume ratio of voids in this fiber nonwoven fabric is calculated, and this value is converted into the volume ratio of voids when the thickness in the fiber nonwoven fabric is the thickness of the porous intermediate layer described below in the functional laminate. The volume ratio of voids can be calculated from the volume and mass of the fiber nonwoven fabric and properties such as the specific gravity of a fiber material. In the present specification, measurement of mass was performed using an electronic balance (AE160 manufactured by Mettler). The volume ratio of voids can also be calculated from the volume of the fiber nonwoven fabric and the void volume of the fiber nonwoven fabric measured by a method such as computer tomography, an immersion method, a water evaporation method, a suspension method, a mercury penetration method, or a gas adsorption method.

As another method for measuring the volume ratio of inter-fiber voids, the nonwoven fabric of the porous intermediate layer impregnated with the foaming resin is cut out of the functional laminate, the volume of the nonwoven fabric and the void volume of the nonwoven fabric measured by a method such as computer tomography, an immersion method, a water evaporation method, a suspension method, a mercury penetration method, or a gas adsorption method are obtained, and then the fiber material is dissolved with a solvent that dissolves only the fiber material among the fibers and the foaming resin which form the nonwoven fabric to obtain the foaming resin alone. A void volume in this foaming resin is measured by a method similar to the above, the void volume of the nonwoven fabric is calculated from the volume of the nonwoven fabric—the void volume of the foaming resin+the void volume of the nonwoven fabric, and from this value and the volume of the nonwoven fabric, the volume ratio of voids in the fiber nonwoven fabric can be calculated.

The average void ratio of the porous intermediate layer, when the porous intermediate layer is a polymer foam, refers to the volume ratio of air bubbles in the polymer that the polymer foam as the porous intermediate layer intrinsically has and is represented by a ratio measured by the method below. The polymer foam of the porous intermediate layer impregnated with the foaming resin is cut out of the functional laminate, and in an optical or electron micrograph of a perpendicular section of the sample, the ratios of the area of air bubbles relative to the entire area are measured at 100 random places at which the foaming of the foaming resin does not occur to determine an average. The area of air bubbles is the area of air bubbles that the polymer foam as the porous intermediate layer intrinsically has, and the air bubbles and the air bubbles caused by the foaming of the foaming resin can be easily discriminated from each other by a difference in brightness or the like around the air bubbles. In the present specification, a parallel section when an optical or electron micrograph is taken refers to a section parallel to the outer surface 12, whereas a perpendicular section refers to a section perpendicular to the outer surface 12 of the porous surface layer.

For the average void ratio of the porous intermediate layer, the value measured from the functional laminate as described above is used; even when measured from a material for use in production (foaming molding), a similar measured value is obtained. That is to say, the average void ratio of the porous intermediate layer can be calculated from the volume and mass of the porous intermediate layer material for use in production (foaming molding) and properties such as the specific gravity of the fibers or the polymer of the porous intermediate layer material. In the present specification, measurement of mass was performed using an electronic balance (AE160 manufactured by Mettler). The average void ratio of the porous intermediate layer can be calculated from the volume of the porous intermediate layer material and the void volume of the porous intermediate layer material measured by a method such as computer tomography, an immersion method, a water evaporation method, a suspension method, a mercury penetration method, or a gas adsorption method. The average void ratio of the porous intermediate layer can also be calculated by measuring, in an optical or electron micrograph of a perpendicular section of the porous intermediate layer material, the ratios of the area of air bubbles relative to the entire area at 100 random places to determine an average.

The thickness of the porous intermediate layer is normally 0.1 to 2 mm and preferably 0.2 to 1 mm in view of the likelihood of the occurrence of the capillary phenomenon in the porous intermediate layer and further improvement in the sound absorbability, the thermal insulating properties, and the damping properties of the functional laminate.

Both when the porous intermediate layer is a fiber nonwoven fabric and when it is a polymer foam, the thickness of the porous intermediate layer is a thickness from an interface 32 of the porous intermediate layer 3 with the porous surface layer 1 to an interface 33 thereof with the resin foamed layer 2 and is represented by a thickness measured by the method below. In an optical micrograph of a perpendicular section of the functional laminate, thicknesses are measured at 100 random places to determine an average.

For the thickness of the porous intermediate layer, the value measured from the functional laminate as described above is used; even when measured from a material for use in production (foaming molding), a similar measured value is obtained. That is to say, in an optical micrograph of a perpendicular section of the porous intermediate layer material for use in production (foaming molding), thicknesses are measured at 100 random places to determine an average. Alternatively, thicknesses of the porous intermediate layer material are measured with an instrument such as a film thickness meter, a displacement meter, or a vernier caliper to determine an average.

When the porous intermediate layer is a fiber nonwoven fabric in particular, the average fiber diameter and the average fiber length of fibers forming the fiber nonwoven fabric are not limited to particular values so long as the porous intermediate layer is more likely to cause the capillary phenomenon than the porous surface layer is. The average fiber diameter is normally 0.005 to 50 μm and preferably 0.1 to 20 μm in view of the likelihood of the occurrence of the capillary phenomenon in the porous intermediate layer and further improvement in the sound absorbability, the thermal insulating properties, and the damping properties of the functional laminate. The average fiber length is normally not less than the thickness of the porous intermediate layer material and preferably 20 mm or more in view of the likelihood of the occurrence of the capillary phenomenon in the porous intermediate layer and further improvement in the sound absorbability, the thermal insulating properties, and the damping properties of the functional laminate.

The average fiber diameter of the fibers in the fiber nonwoven fabric of the porous intermediate layer is represented by an average diameter measured by the method below. The nonwoven fabric of the porous intermediate layer impregnated with the foaming resin is cut out of the functional laminate, and in an optical or electron micrograph of a perpendicular section of the sample, the diameters of 100 random fibers are measured to obtain an average.

The average fiber length of the fibers in the fiber nonwoven fabric of the porous intermediate layer is represented by an average measured by the method below. The nonwoven fabric of the porous intermediate layer impregnated with the foaming resin is cut out of the functional laminate, and the foaming resin is dissolved with an organic solvent that dissolves only the foaming resin among the fibers and the foaming resin which form the nonwoven fabric. The lengths of 100 random fibers are measured from the nonwoven fabric in which the foaming resin has been dissolved to determine an average. Alternatively, the inside of the nonwoven fabric is rendered into a three-dimensional image by a method such as computer tomography (CT), and the lengths of 100 random fibers are measured to determine an average.

For the average fiber diameter and the average fiber length of the fibers of the fiber nonwoven fabric, the values measured from the functional laminate as described above are used; even when measured from a material for use in production (foaming molding), similar measured values are obtained. That is to say, for the average fiber diameter of fibers of a fiber nonwoven fabric for use in production (foaming molding), in an optical or electron micrograph of a perpendicular section of the nonwoven fabric, the diameters of 100 random fibers are measured to determine an average. For the average fiber length of the fibers of the fiber nonwoven fabric for use in production (foaming molding), the lengths of 100 random fibers are measured to determine an average. Alternatively, the inside of the nonwoven fabric is rendered into a three-dimensional image by a method such as computer tomography (CT), and the lengths of 100 random fibers are measured to determine an average.

When the porous intermediate layer is a fiber nonwoven fabric in particular, the basis weight of the fiber nonwoven fabric is not limited to a particular value so long as the porous intermediate layer is more likely to cause the capillary phenomenon than the porous surface layer is, and is normally 5 to 500 g/m$^2$ and preferably 10 to 300 g/m$^2$ in view of the likelihood of the occurrence of the capillary phenomenon in the porous intermediate layer and further improvement in the sound absorbability, the thermal insulating properties, and the damping properties of the functional laminate.

The basis weight of the fiber nonwoven fabric of the porous intermediate layer is represented by a value measured by the method below. The nonwoven fabric of the porous intermediate layer impregnated with the foaming resin is cut out of the functional laminate, and the foaming resin is dissolved with an organic solvent that dissolves only the foaming resin among the fibers and the foaming resin which form the nonwoven fabric to obtain the fiber nonwoven fabric alone. The basis weight can be calculated from the area and mass of the fiber nonwoven fabric. In the present specification, measurement of mass was performed using an electronic balance (AE160 manufactured by Mettler). As another method of measurement, the nonwoven fabric of the porous intermediate layer impregnated with the foaming resin is cut out of the functional laminate, the fiber material is dissolved with a solvent that dissolves only the fiber material among the fibers and the foaming resin which form the nonwoven fabric to obtain a solution of the fiber material. A liquid content of this solution of the fiber material is evaporated, then the mass of the fiber material in a solid content is calculated from the mass of the solid content after evaporation, and the basis weight can be calculated from the area of the nonwoven fabric and the mass of the fiber material.

For the basis weight of the fiber nonwoven fabric, the value measured from the functional laminate as described above is used; even when measured from a material for use in production (foaming molding), a similar measured value is obtained. That is to say, the basis weight can be calculated from the area and mass of the fiber nonwoven fabric for use in production (foaming molding). In the present specification, measurement of mass was performed using an electronic balance (AE160 manufactured by Mettler).

(Porous Surface Layer)

The material forming the porous surface layer 1 is not limited to a particular material so long as it has porosity and may be a fiber nonwoven fabric or a polymer foam, for example.

The porous surface layer 1 may have or does not necessarily have an affinity to the foaming resin. The porous surface layer 1 preferably has a less affinity to the foaming resin than the porous intermediate layer in view of the likelihood of the occurrence of the capillary phenomenon in the porous intermediate layer and further improvement in the sound absorbability, the thermal insulating properties, and the damping properties of the functional laminate. The fact that the porous surface layer 1 has the affinity less than the porous intermediate layer means that the contact angle θs of the porous surface layer 1 relative to the foaming resin is larger than the contact angle θm of the porous intermediate layer relative to the foaming resin. In view of the same, the porous surface layer 1 preferably has the relation of "θs−θm" described above relative to the porous intermediate layer.

The contact angle θs of the porous surface layer 1 relative to the foaming resin is normally 1° or more, preferably 1° to 90°, more preferably 5° to 90°, even more preferably 5° to 30°, and most preferably 8° to 30° in view of the likelihood of the occurrence of the capillary phenomenon in the porous intermediate layer and further improvement in the sound absorbability, the thermal insulating properties, and the damping properties of the functional laminate. The contact angle θs of the porous surface layer 1 relative to the foaming resin refers to a contact angle of the foaming resin on a plane having a surface with a composition equivalent to that of the material forming the porous surface layer.

The following exemplifies specific examples of the fiber nonwoven fabric and the polymer foam as the material forming the porous surface layer 1. When the porous surface layer formed of a material that does not intrinsically have the contact angle θs described above is used, surface treatment that increases or decreases a contact angle before and after treatment may be performed on the porous surface layer, and the one having a controlled contact angle may be used as the porous surface layer. θ shown together with specific examples below is a contact angle that a certain material intrinsically shows without any treatment and refers to a contact angle relative to the foaming resin measured by the method described above. Examples of the surface treatment include non-affinity treatment that increases a contact angle by application of a solution of a fluorine atom-containing resin (e.g., a fluorine atom-containing polymer) or a silicone group-containing resin.

Specific examples of the fiber nonwoven fabric of the porous surface layer include nonwoven fabrics of one or more organic fibers selected from the group including polyolefin fibers such as polypropylene (PP) fibers (θ=20°), fluorine-containing resin fibers such as polytetrafluoroethylene (PTFE), and silicone-containing resin fibers. The fiber nonwoven fabric of the porous surface layer may be a nonwoven fabric of one or more inorganic fibers selected from the group including glass fibers (θ=12°), and silica fibers (θ=15°). The fiber nonwoven fabric of the porous intermediate layer may be a nonwoven fabric of a fiber blend of organic fibers and inorganic fibers.

For the polymer foam of the porous surface layer, one having an open-cell structure or a closed-cell structure is used. Specific examples of such a polymer foam include polymer foamed layers selected from the group including a polyolefin foamed layer such as a polypropylene foamed layer (θ=20°); a fluorine-containing resin foamed layer (θ=30°); and a silicone resin foamed layer (θ=30°).

The porous surface layer is preferably a fiber nonwoven fabric, more preferably a nonwoven fabric of inorganic fibers or organic fibers, and even more preferably a nonwoven fabric of glass fibers in view of further improvement in the sound absorbability, the thermal insulating properties, and the damping properties of the functional laminate.

The average void ratio Rs of the porous surface layer is normally 80 to 99.5% and preferably 90 to 99% in view of the likelihood of the occurrence of the capillary phenomenon in the porous intermediate layer and further improvement in the sound absorbability, the thermal insulating properties, and the damping properties of the functional laminate.

The average void ratio of the porous surface layer, when the porous surface layer is a fiber nonwoven fabric, refers to the volume ratio of voids formed among fibers, that is, the volume ratio of inter-fiber voids and is represented by a ratio measured by the method below. The nonwoven fabric of a porous surface layer part that is not impregnated with the foaming resin is cut out of the functional laminate. The volume ratio of voids in this fiber nonwoven fabric is calculated, and this value is converted into the volume ratio of voids when the thickness in the fiber nonwoven fabric is the thickness of the porous surface layer described below in the functional laminate. The volume ratio of voids can be calculated from the volume and mass of the fiber nonwoven fabric and properties such as the specific gravity of the fibers. In the present specification, measurement of mass was performed using an electronic balance (AE160 manufactured by Mettler). The volume ratio of voids can also be calculated from the volume of the fiber nonwoven fabric and the void volume of the fiber nonwoven fabric measured by a method such as computer tomography, an immersion method, a water evaporation method, a suspension method, a mercury penetration method, or a gas adsorption method.

The average void ratio of the porous surface layer, when the porous surface layer is a polymer foam, refers to the volume ratio of air bubbles in the polymer that the polymer foam as the porous surface layer intrinsically has and is represented by a ratio measured by the method below. The average void ratio of the porous surface layer can be calculated by cutting the polymer foam of the porous surface layer part that is not impregnated with the foaming resin out of the functional laminate and, in an optical or electron micrograph of a perpendicular section of the sample, measuring the ratios of the area of air bubbles relative to the entire area at 100 random places to determine an average.

For the average void ratio of the porous surface layer, the value measured from the functional laminate as described above is used; even when measured from a material for use in production (foaming molding), a similar measured value is obtained. That is to say, the average void ratio of the porous surface layer can be calculated from the volume and mass of the porous surface layer material for use in production (foaming molding) and properties such as the specific gravity of the fibers or the polymer of the porous surface layer material. In the present specification, measurement of mass was performed using an electronic balance (AE160 manufactured by Mettler). The average void ratio of the porous surface layer can also be calculated from the volume of the porous surface layer material and the void volume of the porous surface layer material measured by a method such as computer tomography, an immersion method, a water evaporation method, a suspension method, a mercury penetration method, or a gas adsorption method. The average void ratio of the porous surface layer can also be calculated by measuring, in an optical or electron micrograph of a perpendicular section of the porous surface layer material, the ratios of the area of air bubbles relative to the entire area at 100 random places to determine an average.

The thickness of the porous surface layer is normally 1 to 50 mm and preferably 2 to 30 mm in view of the likelihood of the occurrence of the capillary phenomenon in the porous intermediate layer and further improvement in the sound absorbability, the thermal insulating properties, and the damping properties of the functional laminate.

Both when the porous surface layer is a fiber nonwoven fabric and when it is a polymer foam, the thickness of the porous surface layer is a thickness including a mixed layer part described below, is a thickness from the outer surface 12 of the porous surface layer 1 to an interface 13 thereof with the porous intermediate layer 3, and is represented by a thickness measured by the method below. In an optical micrograph of a perpendicular section of the functional laminate, thicknesses are measured at 100 random places to determine an average.

For the thickness of the porous surface layer, the value measured from the functional laminate as described above is used; even when measured from a material for use in production (foaming molding), a similar measured value is obtained. That is to say, in an optical micrograph of a perpendicular section of the porous surface layer material for use in production (foaming molding), thicknesses are measured at 100 random places to determine an average. Alternatively, thicknesses of the porous surface layer material are measured with an instrument such as a film thickness meter, a displacement meter, or a vernier caliper to determine an average.

When the porous surface layer is a fiber nonwoven fabric in particular, the average fiber diameter and the average fiber length of fibers forming the fiber nonwoven fabric are not limited to particular values so long as the porous intermediate layer is more likely to cause the capillary phenomenon than the porous surface layer is. The average fiber diameter is normally 0.005 to 50 µm, preferably 0.1 to 20 µm, and more preferably 1 to 5 µm in view of the likelihood of the occurrence of the capillary phenomenon in the porous intermediate layer and further improvement in the sound absorbability, the thermal insulating properties, and the damping properties of the functional laminate. The average fiber length is normally 2 mm or more and preferably 20 mm or more in view of the likelihood of the occurrence of the capillary phenomenon in the porous intermediate layer and further improvement in the sound absorbability, the thermal insulating properties, and the damping properties of the functional laminate.

The average fiber diameter of the fibers in the fiber nonwoven fabric of the porous surface layer is represented by an average diameter measured by the method below. The nonwoven fabric of the porous surface layer part that is not impregnated with the foaming resin is cut out of the functional laminate, and in an optical or electron micrograph of a perpendicular section of the sample, the diameters of 100 random fibers are measured to determine an average.

The average fiber length of the fibers in the fiber nonwoven fabric of the porous surface layer is represented by an average measured by the method below. The nonwoven fabric of the porous surface layer part that is not impregnated with the foaming resin is cut out of the functional laminate, and the lengths of 100 random fibers are measured from the nonwoven fabric to determine an average. Alternatively, the inside of the nonwoven fabric is rendered into a three-dimensional image by a method such as computer tomography (CT), and the lengths of 100 random fibers are measured to determine an average.

For the average fiber diameter and the average fiber length of the fibers of the fiber nonwoven fabric, the values measured from the functional laminate as described above are used; even when measured from a material for use in production (foaming molding), similar measured values are obtained. That is to say, for the average fiber diameter of fibers of a fiber nonwoven fabric for use in production (foaming molding), in an optical or electron micrograph of a perpendicular section of the nonwoven fabric, the diameters of 100 random fibers are measured to determine an average. For the average fiber length of the fibers of the fiber nonwoven fabric for use in production (foaming molding), the lengths of 100 random fibers are measured to determine an average. Alternatively, the inside of the nonwoven fabric is rendered into a three-dimensional image by a method such as CT, and the lengths of 100 random fibers are measured to determine an average.

When the porous surface layer is a fiber nonwoven fabric in particular, the basis weight of the fiber nonwoven fabric is not limited to a particular value so long as the porous intermediate layer is more likely to cause the capillary phenomenon than the porous surface layer is, and is normally 50 to 6,000 g/m$^2$ and preferably 100 to 3,000 g/m$^2$ in view of the likelihood of the occurrence of the capillary phenomenon in the porous intermediate layer and further improvement in the sound absorbability, the thermal insulating properties, and the damping properties of the functional laminate.

The basis weight of the fiber nonwoven fabric of the porous surface layer is represented by a value measured by the method below. The nonwoven fabric of the porous surface layer part that is not impregnated with the foaming resin is cut out of the functional laminate, and the basis weight can be calculated from the area and mass of the nonwoven fabric. In the present specification, measurement of mass was performed using an electronic balance (AE160 manufactured by Mettler).

For the basis weight of the fiber nonwoven fabric, the value measured from the functional laminate as described above is used; even when measured from a material for use in production (foaming molding), a similar measured value is obtained. That is to say, the basis weight can be calculated from the area and mass of the fiber nonwoven fabric for use in production (foaming molding). In the present specification, measurement of mass was performed using an electronic balance (AE160 manufactured by Mettler).

(Resin Foamed Layer)

The resin foamed layer 2 is a foamed layer of a polymer. The polymer forming the resin foamed layer may be any polymer known as a polymer that can form foams in the field of plastics. Specific examples of the resin foamed layer include polymer foamed layers selected from the group including a polyurethane foamed layer; a polyolefin foamed layer such as a polyethylene foamed layer and a polypropylene foamed layer; a polyester foamed layer such as a PET foamed layer; a silicone foamed layer; and a polyvinyl chloride foamed layer.

The resin foamed layer is preferably a polyurethane foamed layer in view of further improvement in the sound absorbability, the thermal insulating properties, and the damping properties of the functional laminate.

An average void diameter Df of the resin foamed layer, which is not limited to a particular diameter, may be within a range of 0.04 to 800 µm, for example, especially 10 to 600 µm in accordance with the frequency of a sound to be absorbed. The larger the average void diameter Df of the resin foamed layer becomes within the above range, the higher the frequency of the sound to be absorbed becomes. On the other hand, the smaller the average void diameter Df of the resin foamed layer becomes within the above range, the lower the frequency of the sound to be absorbed becomes.

When the average void diameter Df of the resin foamed layer is 50 to 500 µm, especially 100 to 300 µm, for example, sounds with a frequency of 1,000 to 4,000 Hz are effectively absorbed. Such sound absorption is suitable when the functional laminate is used in cover member use for automobile powertrain members.

The average void diameter Df of the resin foamed layer refers to the diameter of air bubbles in the polymer and is represented by an average diameter measured by the method below. The resin foamed layer is cut out of the functional laminate, and in an optical or electron micrograph of a parallel section of the sample, the diameters of 100 random air bubbles are measured to determine an average.

An average void ratio Rf of the resin foamed layer is normally 60 to 98% and preferably 80 to 95% in view of the likelihood of the occurrence of the capillary phenomenon in the porous intermediate layer and further improvement in the sound absorbability, the thermal insulating properties, and the damping properties of the functional laminate.

The average void ratio of the resin foamed layer refers to the volume ratio of air bubbles in the polymer and is represented by a ratio measured by the method below. The resin foamed layer is cut out of the functional laminate, and in an optical or electron micrograph of a perpendicular section of the resin foamed material, the ratios of the area of air bubbles relative to the entire area are measured at 100 random places to determine an average. The average void ratio of the resin foamed layer can also be calculated from the volume and mass of the resin foamed material and properties such as the specific gravity of the polymer. In the present specification, measurement of mass was performed using an electronic balance (AE160 manufactured by Mettler). The average void ratio of the resin foamed layer can also be calculated from the volume of the resin foamed material and the void volume of the resin foamed material measured by a method such as computer tomography, an immersion method, a water evaporation method, a suspension method, a mercury penetration method, or a gas adsorption method.

The thickness of the resin foamed layer is normally 1 to 100 mm and preferably 2 to 30 mm in view of the likelihood of the occurrence of the capillary phenomenon in the porous intermediate layer and further improvement in the sound absorbability, the thermal insulating properties, and the damping properties of the functional laminate.

The thickness of the resin foamed layer is a thickness in a substantially perpendicular direction to the outer surface 12 of the porous surface layer 1, is a thickness to an interface 22 of the resin foamed layer 2 with the porous intermediate layer 3, and is represented by a thickness measured by the method below. In an optical micrograph of a perpendicular section of the functional laminate, thicknesses are measured at 100 random places to determine an average.

(Mixed Layer Part)

The functional laminate 10 of the present disclose includes the mixed layer part 11 between the porous intermediate layer 3 and the porous surface layer 1. Specifically, the porous surface layer 1 includes the mixed layer part 11 at a position facing the porous intermediate layer 3. More specifically, part of the porous surface layer 1 facing the porous intermediate layer 3 is transformed into the mixed layer part 11; in other words, the mixed layer part 11 is generated in the part within the porous surface layer 1 facing the porous intermediate layer 3. The mixed layer part increases the rigidity of the functional laminate.

The mixed layer part is a composite layer of the resin foamed layer and the porous surface layer formed between the porous intermediate layer and the porous surface layer. The mixed layer part is specifically a layer formed by the foaming resin forming the resin foamed layer permeating the porous surface layer, foamed, and cured and, in other words, is a layer in which the material forming the porous surface layer and the material forming the resin foamed layer coexist. In the mixed layer part, within voids of the porous surface layer before the permeation of the foaming resin, air bubbles by the foaming resin are formed.

An average void diameter Dx of the mixed layer part, which is not limited to a particular diameter, may be within a range of 0.04 to 800 µm, for example, especially 10 to 500 µm in accordance with the frequency of the sound to be absorbed. The larger the average void diameter Dx of the mixed layer part becomes within the above range, the higher the frequency of the sound to be absorbed becomes. On the other hand, the smaller the average void diameter Dx of the mixed layer part becomes within the above range, the lower the frequency of the sound to be absorbed becomes.

When the average void diameter Dx of the mixed layer part is 50 to 250 µm, especially 60 to 200 µm, for example, sounds with a frequency of 1,000 to 4,000 Hz are effectively absorbed. Such sound absorption is suitable when the functional laminate is used in cover member use for automobile powertrain members.

The average void diameter Dx of the mixed layer part refers to the diameter of air bubbles in the resin (polymer) formed within the voids of the porous surface layer before the permeation of the foaming resin and is represented by an average diameter measured by the method below. In an optical or electron micrograph of a parallel section of the mixed layer part in the functional laminate, the diameters (the largest diameters) of 100 random air bubbles are measured to determine an average. The 100 random air bubbles refer to 100 random air bubbles formed by the foaming of the foaming resin, and the air bubbles and the air bubbles that the polymer foam as the porous surface layer intrinsically has can be easily discriminated from each other by a difference in brightness or the like around the air bubbles. The average diameter can also be calculated by cutting the mixed layer part out of the functional laminate and measuring the distribution of the diameter of voids in this mixed layer part by a method such as a mercury penetration method or a gas adsorption method.

An average void ratio Rx of the mixed layer part is normally 30 to 95% and preferably 50 to 90% in view of further improvement in the sound absorbability, the thermal insulating properties, and the damping properties of the functional laminate.

The average void ratio of the mixed layer part refers to the volume ratio of air bubbles in the resin (polymer) formed within the voids of the porous surface layer before the permeation of the foaming resin and is represented by a ratio measured by the method below. In an optical or electron micrograph of a perpendicular section of the mixed layer part in the functional laminate, the ratios of the area of air bubbles relative to the entire area are measured at 100 random places to determine an average. The area of air bubbles is the area of air bubbles in the resin (polymer) formed by the foaming of the foaming resin within the voids of the porous surface layer; when the porous surface layer is a polymer foam, the air bubbles and the air bubbles that the polymer foam intrinsically has can be easily discriminated from each other by a difference in brightness or the like around the air bubbles. As another method of measurement, the mixed layer part is cut out of the functional laminate, and the average void ratio of the mixed layer part can be calculated from the volume and mass of the mixed layer part and properties such as the specific gravity of the polymer. The average void ratio of the mixed layer part can also be calculated from the volume of the mixed layer part and the void volume of the mixed layer part measured by a method such as computer tomography, an immersion method, a water evaporation method, a suspension method, a mercury penetration method, or a gas adsorption method.

The thickness of the mixed layer part is normally 0.05 to 3 mm, preferably 0.1 to 2 mm, and more preferably 0.2 to 1.7 mm in view of further improvement in sound absorbability, thermal insulating properties, and damping properties (especially sound absorbability) in cover member use for automobile powertrain members.

The thickness of the mixed layer part refers to a thickness in a substantially perpendicular direction to the outer surface 12 of the porous surface layer 1, is a thickness from an interface 13 of the porous surface layer 1 with the porous intermediate layer 3 to a region within the porous surface layer 1 that is not impregnated with the foaming resin, and is represented by a thickness measured by the method below. In an optical or electron micrograph of a perpendicular section near the mixed layer part in the functional laminate, thicknesses are measured at 100 random places to determine an average. In the optical or electron micrograph, that the porous surface layer 1 is impregnated with the foaming resin or is not impregnated therewith can be easily discriminated from each other by the presence or absence of the foaming resin within voids of the porous surface layer 1. [Production Method for Functional Laminate] The functional laminate of the present disclosure can be produced by a production method including a lamination base forming process and a foaming molding process below.
(Lamination Base Forming Process)

In the present process, the porous surface layer 1 and the porous intermediate layer 3 are laminated together to obtain a lamination base 40. The lamination may be performed by simply placing another layer on one layer; in view of the handleability of the lamination base, the porous surface layer 1 and the porous intermediate layer 3 are preferably bonded to each other.

The method of bonding is not limited to a particular method so long as connection between the porous surface layer 1 and the porous intermediate layer 3 is achieved; a method using an adhesive may be employed, for example. The bonding may be achieved at part of a contact face between the porous surface layer 1 and the porous intermediate layer 3 or achieved across the entire contact face. The bonding is preferably achieved at part of the contact face between the porous surface layer 1 and the porous intermediate layer 3 in view of further improvement in sound absorbability, thermal insulating properties, and damping properties (especially sound absorbability) in cover member use for automobile powertrain members.

For the porous surface layer 1 and the porous intermediate layer 3, the respective materials described above can be used, which are commercially available. When the porous surface layer 1 and the porous intermediate layer 3 are each a fiber nonwoven fabric in particular, certain fibers adjusted to desired properties and formed by a known method of forming such as heat press molding or needle punching (a sheet-shaped material) can be used.
(Foaming Molding Process)

Figure 2A:
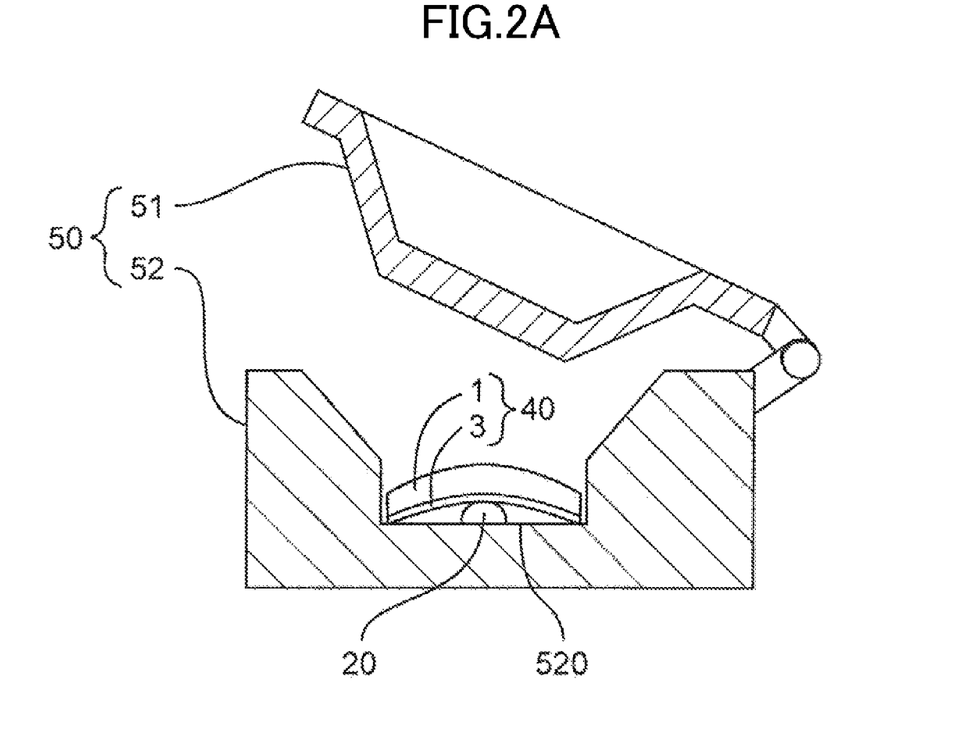
FIG. 2A illustrates a schematic sectional view of a mold and the inside thereof for illustrating a foaming preparation stage of a foaming molding process in a production method for a functional laminate of the present disclosure.

In the present process, as illustrated in FIG. 2A, foaming molding is performed within a mold 50. The mold 50 normally includes an upper mold 51 and a lower mold 52. FIG. 2A illustrates a schematic sectional view of the mold and the inside thereof for illustrating a foaming preparation stage of the foaming molding process.

Figure 2B:
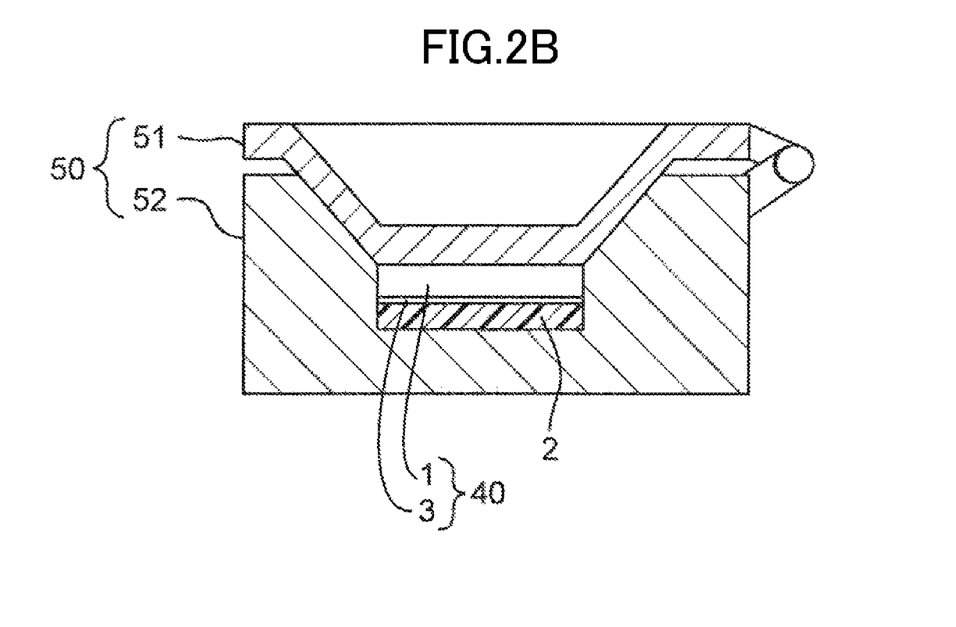
FIG. 2B illustrates a schematic sectional view of the mold and the inside thereof for illustrating a foaming stage of the foaming molding process in the production method for a functional laminate of the present disclosure.

The foaming molding is performed on the side of the porous intermediate layer 3 of the lamination base 40 using a foaming resin 20 as a raw material forming the resin foamed layer 2. Performing the foaming molding on the side facing the porous intermediate layer 3 of the lamination base 40 means that the foaming molding is performed with the foaming resin 20 and the lamination base 40 placed such that the resin foamed layer 2 will be formed on the side of the porous intermediate layer 3 of the lamination base 40. As illustrated in FIG. 2A, for example, the foaming resin 20 is injected onto a molding face 520 of the lower mold 52, and then the lamination base 40 is placed on the foaming resin 20 so as to bring the porous intermediate layer 3 into contact with the foaming resin 20. (The lamination base 40 may be placed on the upper mold 51 so as to bring the porous intermediate layer 3 into contact with the foaming resin 20.) Subsequently, the upper mold 51 is closed as illustrated in FIG. 2B, and upon start of foaming, the foaming resin 20 expands to fill a cavity between the upper mold 51 and the lower mold 52, and the resin foamed layer 2 is formed. The molded body is removed from the mold to obtain a functional laminate in which the porous surface layer 1, the resin foamed layer 2, and the porous intermediate layer 3 are integrated together. FIG. 2B illustrates a schematic sectional view of the mold and the inside thereof for illustrating a foaming stage of the foaming molding process.

The foaming resin 20 is a raw material of the resin foamed layer; when the resin foamed layer is a polyurethane foamed layer, for example, a mixture of a polyol compound and an isocyanate compound is used for the foaming resin 20. The foaming resin 20 may contain additives such as a foaming agent and a foam stabilizer.

Foaming conditions are determined as appropriate in accordance with the type of the foaming resin 20; the mold 50 may be heated and/or the inside of the mold 50 may be pressurized or decompressed, for example.

[Uses]

The functional laminate 10 of the present disclosure is excellent in sound absorbability, thermal insulating properties, and damping properties (especially sound absorbability) and is thus useful as sound absorbing materials, thermal insulating materials, and/or damping materials (especially sound absorbing materials).

Examples of fields in which the functional laminate 10 of the present disclosure is useful include engine-equipped machines such as vehicles (such as automobiles, trucks, buses, and trains) and agricultural machines (such as mowers and cultivators).

When the functional laminate 10 of the present disclosure is used as a sound absorbing thermal insulating material in an engine-equipped machine, for example, it is specifically used as a cover member for powertrain members including an engine and a transmission. In this situation, the functional laminate 10 is more specifically used as a cover member surrounding the powertrain members partially or collectively. The functional laminate 10 is placed and used such that the resin foamed layer 2 is in contact with the powertrain members. Alternatively, the functional laminate 10 is used such that the porous surface layer 1 faces a sound source and/or a heat source in a noncontact manner, that is, such that the engine and the transmission are placed at a position facing the porous surface layer 1.

[Other Aspects of the Present Disclosure]

A contact angle $\theta m$ of the porous intermediate layer relative to the foaming resin may be smaller than a contact angle $\theta s$ of the porous surface layer relative to the foaming resin.

The contact angle $\theta m$ of the porous intermediate layer relative to the foaming resin and the contact angle $\theta s$ of the porous surface layer relative to the foaming resin may satisfies a relational expression below:

$$3°≤θs−θm≤20°$$

The porous intermediate layer may be more likely to cause a capillary phenomenon than the porous surface layer is owing to the affinity.

The contact angle θm of the porous intermediate layer relative to the foaming resin may be 1° to 15°.

The porous intermediate layer may have a thickness of 0.1 to 2 mm.

The porous intermediate layer may be a fiber nonwoven fabric.

The contact angle θs of the porous surface layer relative to the foaming resin may be 5° to 30°.

The porous surface layer may have a thickness of 1 to 50 mm.

The porous surface layer may be a fiber nonwoven fabric.

The mixed layer part may have a thickness of 0.2 to 1.7 mm.

The mixed layer part may have an average void diameter of 60 to 200 μm.

The mixed layer part may have an average void ratio of 50 to 90%.

The functional laminate may be used as a sound absorbing material, a thermal insulating material, and/or a damping material.

The functional laminate may be placed and used such that the resin foamed layer is in contact with a heat source and/or a sound source or is placed and used such that the porous surface layer faces a heat source and/or a sound source in a noncontact manner.

The functional laminate may be used as a cover member for powertrain members including an engine and a transmission of an automobile.

EXAMPLES (Method of Measurement)

Various kinds of properties of layers were measured by the methods described above. For measurement of a contact angle of glass wool, a glass plate with a composition equivalent to that of the glass wool was used. For measurement of a contact angle of a PET nonwoven fabric, a PET plate with a composition equivalent to that of the PET nonwoven fabric was used. For measurement of a contact angle of an alumina nonwoven fabric, an alumina plate with a composition equivalent to that of the alumina nonwoven fabric was used. For measurement of a contact angle of a PP nonwoven fabric, a PP plate with a composition equivalent to that of the PP nonwoven fabric was used. The surface roughness of the plates for use in measurement of the contact angle was in common 1.6 μm or less in terms of Ra.

(Method of Evaluation)

Sound Absorption Coefficient (α):

Using a normal incident sound absorption coefficient measurement system WinZacMTX manufactured by Nihon Onkyo Engineering Co., Ltd., a normal incident sound absorption coefficient was measured using a sound tube with an inner diameter of 40 mm in a measurement frequency range of from 200 Hz to 4,800 Hz (1/3 octave band) (in conformity with JIS A 1405-2 and ISO 10534-2) to calculate an average normal incident sound absorption coefficient for 1,000 Hz to 4,000 Hz. For a sample to be measured, a cut in a cylindrical shape with a diameter of 40 mm out of a functional laminate obtained in each of examples and comparative examples was used. The functional laminate as the sample to be measured was placed so as to make a sound incident from the porous surface layer 1. Evaluation was performed based on an increase from a sound absorption coefficient in comparative examples using the same porous surface layer without using the porous intermediate layer.

A: 3.5%≤increase; (best)
B: 2.0%≤increase<3.5%; (good)
C: 1.0%≤increase<2.0%; (practically no problem)
D: increase<1.0%

Thermal Conductivity:

Using a stationary method thermal conductivity measurement apparatus HFM 436/3/1 Lambda manufactured by Netzsch, at a measurement temperature of 30° C., the thermal conductivity of the functional laminate in the thickness direction was measured based on JIS A 1412-2 Part 2: Heat flow meter method.

Examples 1 to 4 and Comparative Example 3

Lamination Base Forming Process

Glass Wool A with an average fiber diameter of about 7.5 μm was heat press molded so as to have an average void ratio and a thickness listed in Table 1 to obtain the porous surface layer 1. The porous intermediate layer 3 in Table 1 was bonded to this porous surface layer 1 to obtain the lamination base 40. The bonding was achieved with an adhesive at part of a contact face between the porous surface layer and the porous intermediate layer.

Foaming Molding Process

A raw material of a polyurethane foam in Table 1 was mixed with a mixer as the foaming resin 20 and was injected onto the molding face 520 of the lower mold 52 as illustrated in FIG. 2A. Next, the lamination base 40 was placed on the foaming resin 20 so as to bring the porous intermediate layer 3 into contact with the foaming resin 20. Subsequently, in a 25° C., normal pressure environment, the upper mold 51 was closed as illustrated in FIG. 2B, and upon start of foaming, the foaming resin 20 expanded to fill the cavity (dimensions: 100 mm×100 mm×25 mm) between the upper mold 51 and the lower mold 52, and the resin foamed layer 2 was formed. The mold 50 was cooled, then the molded body was removed from the mold to obtain a functional laminate in which the porous surface layer 1, the resin foamed layer 2, and the porous intermediate layer 3 are integrated together.

Examples 5 to 7

The lamination base forming process and the foaming molding process were performed by a method similar to that of Example 1 except that Glass Wool B with an average fiber diameter of about 3.5 μm that had been heat press molded to have an average void ratio and a thickness listed in Table 1 was used as the porous surface layer 1 and that the porous intermediate layer 3 in Table 1 was used.

Comparative Example 1

The lamination base forming process and the foaming molding process were performed by a method similar to that of Example 1 except that the porous surface layer was used alone in place of the lamination base without using the porous intermediate layer.

Comparative Example 2

The lamination base forming process and the foaming molding process were performed by a method similar to that of Example 2 except that the porous surface layer was used alone in place of the lamination base without using the porous intermediate layer.

TABLE 1

|  |  | Example 1 | Example 2 | Example 3 | Example 4 | Example 5 |
|---|---|---|---|---|---|---|
| Porous Surface Layer | Material Type | Glass Wool A | Glass Wool A | Glass Wool A | Glass Wool A | Glass Wool B |
|  | Contact Angle θs | 12° | 12° | 12° | 12° | 12° |
|  | Average Void Ratio Rs | 98% | 98% | 98% | 98% | 96% |
|  | Thickness | 20 mm | 20 mm | 20 mm | 20 mm | 20 mm |
| Mixed Layer Part | Average Void Diameter | 160 μm | 150 μm | 150 μm | 150 μm | 100 μm |
|  | Average Void Ratio | 60% | 60% | 60% | 60% | 55% |
|  | Thickness | 0.6 mm | 1.1 mm | 0.9 mm | 1.1 mm | 1.1 mm |
| Porous Intermediate Layer | Material Type | PET Nonwoven Fabric A | PET Nonwoven Fabric B | PET Nonwoven Fabric C | Alumina Cloth | PET Nonwoven Fabric B |
|  | Contact Angle θm | 4° | 4° | 4° | 4° | 4° |
|  | Average Void Ratio Rm | 92% | 85% | 78% | 69% | 85% |
|  | Thickness | 0.62 mm | 0.25 mm | 0.38 mm | 0.31 mm | 0.25 mm |
| Resin Foamed Layer | Material Type | Polyurethane Foam A | Polyurethane Foam A | Polyurethane Foam A | Polyurethane Foam A | Polyurethane Foam A |
|  | Average Void Diameter | 200 μm | 200 μm | 200 μm | 200 μm | 200 μm |
|  | Average Void Ratio | 87% | 87% | 87% | 87% | 87% |
|  | Thickness | 5 mm | 5 mm | 5 mm | 5 mm | 5 mm |
| Rs/Rm |  | 1.065 | 1.153 | 1.256 | 1.420 | 1.129 |
| Sound Absorption Coefficient*: Evaluation [Increase From Comparative Example] |  | 85.7%: B [3.2%][1] | 87.1%: A [4.6%][1] | 86.4%: A [3.9%][1] | 86.1%: A [3.6%][1] | 89.2%: A [4.1%][2] |
| Thermal Conductivity |  | — | — | — | — | — |

|  |  | Example 6 | Example 7 | Comparative Example 1 | Comparative Example 2 | Comparative Example 3 |
|---|---|---|---|---|---|---|
| Porous Surface Layer | Material Type | Glass Wool B | Glass Wool B | Glass Wool A | Glass Wool B | Glass Wool A |
|  | Contact Angle θs | 12° | 12° | 12° | 12° | 12° |
|  | Average Void Ratio Rs | 98% | 99% | 98% | 98% | 98% |
|  | Thickness | 20 mm | 20 mm | 20 mm | 20 mm | 20 mm |
| Mixed Layer Part | Average Void Diameter | 110 μm | 110 μm | 50 μm | 45 μm | 100 μm |
|  | Average Void Ratio | 55% | 55% | 60% | 55% | 60% |
|  | Thickness | 1.1 mm | 1.1 mm | 2.3 mm | 2.1 mm | 1.7 mm |
| Porous Intermediate Layer | Material Type | PET Nonwoven Fabric B | PET Nonwoven Fabric B | — | — | PP Nonwoven Fabric |
|  | Contact Angle θm | 4° | 4° | — | — | 20° |
|  | Average Void Ratio Rm | 85% | 85% | — | — | 89% |
|  | Thickness | 0.25 mm | 0.25 mm | — | — | 0.15 mm |
| Resin Foamed Layer | Material Type | Polyurethane Foam A | Polyurethane Foam A | Polyurethane Foam A | Polyurethane Foam A | Polyurethane Foam A |
|  | Average Void Diameter | 200 μm | 200 μm | 200 μm | 200 μm | 200 μm |
|  | Average Void Ratio | 87% | 87% | 87% | 87% | 87% |
|  | Thickness | 5 mm | 5 mm | 5 mm | 5 mm | 5 mm |

TABLE 1-continued

| | | | | | |
|---|---|---|---|---|---|
| Rs/Rm | 1.153 | 1.165 | — | — | 1.101 |
| Sound Absorption Coefficient*: Evaluation [Increase From Comparative Example] | 90.1%: A [5.0%][2] | 87.8%: B [2.7%][2] | 82.5% | 85.1% | 83.3%: D [0.8%][1] |
| Thermal Conductivity | 0.035 | — | — | 0.036 | — |

*1,000-4,000 Hz Sound absorption coefficient (⅓ octave band), (1) Increase from Comparative Example 1, (2) Increase from Comparative Example 2
Glass wool A: Glass fibers having an average fiber diameter of about 7.5 μm and an average fiber length of about 50 mm (the basis weight of the porous surface layer 1 with Glass Wool A, Examples 1 to 4: 960 g/m², Comparative Example 1: 960 g/m², and Comparative Example 3: 960 g/m²)
Glass Wool B: Glass fibers having an average fiber diameter of about 3.5 pm and an average fiber length of about 50 mm (the basis weight of the porous surface layer 1 with Glass Wool B, Example 5: 1,920 g/m², Example 6: 960 g/m², Example 7: 480 g/m², and Comparative Example 2: 960 g/m²)
PET Nonwoven Fabric A: 4061P (manufactured by Toyobo Co., Ltd., basis weight: 70 g/m²)
PET Nonwoven Fabric B: H3501AD (manufctured by Toyobo Co., Ltd., basis weight: 50.7 g/m²)
PET Nonwoven Fabric C: H3A11A (manufctured by Toyobo Co., Ltd., basis weight: 111.4 g/m²)
Alumina Cloth 3025-T (manufctured by Nitivy Co., Ltd., basis weight: 280 g/m²)
PP (polypropylene) Nonwoven Fabric SP-1017E (manufctured by Maeda Kosen Co., Ltd., basis weight: 17 g/m²)
Raw Material of Polyurethane Foam A: DK System (manufactured by DKS Co. Ltd.)

INDUSTRIAL APPLICABILITY

The functional laminate of the present disclosure is useful as sound absorbing materials, thermal insulating materials, and/or damping materials in the field of engine-equipped machines such as vehicles (such as automobiles, trucks, buses, and trains) and agricultural machines (such as mowers and cultivators).

DESCRIPTION OF REFERENCE CHARACTERS

1 Porous Surface Layer
2 Resin Foamed Layer
3 Porous Intermediate Layer
10 Functional Laminate
11 Mixed Layer Part
12 Outer Surface of Porous Surface Layer
13 Interface of Porous Surface Layer with Porous Intermediate Layer
20 Foaming Resin
22 Interface of Resin Formed Layer with Porous Intermediate Layer
32 Interface of Porous Intermediate Layer with Porous Surface Layer
33 Interface of Porous Intermediate Layer with Resin Formed Layer
40 Lamination Base
50 Mold
51 Upper Mold
52 Lower Mold
520 Molding Face of Lower Mold

The invention claimed is:

1. A functional laminate including a porous intermediate layer having air permeability laminated between a porous surface layer and a resin foamed layer,
each of the porous intermediate layer and the porous surface layer having an affinity to a foaming resin forming the resin foamed layer, wherein
the affinity of the porous intermediate layer is higher than the affinity of the porous surface layer, and
the contact angle θm(°) of the porous intermediate layer relative to the foaming resin and the contact angle θs(°) of the porous surface layer relative to the foaming resin satisfy a relational expression below:

$$1° \leq θs - θm \leq 30°,$$

the porous surface layer includes, at a position facing the porous intermediate layer, a mixed layer part of the resin foamed layer and the porous surface layer, and
the thickness of the mixed layer part is 0.05 to 3 mm.

2. The functional laminate of claim 1, wherein
the porous intermediate layer has an average void ratio of 60 to 95%.

3. The functional laminate of claim 1, wherein
the porous intermediate layer is a nonwoven fabric of organic fibers selected from the group consisting of polyester-based fibers.

4. The functional laminate of claim 3, wherein
fibers forming the fiber nonwoven fabric of the porous intermediate layer have an average fiber diameter of 0.005 to 50 μm.

5. The functional laminate of claim 1, wherein
the porous surface layer has an average void ratio of 80 to 99.5%.

6. The functional laminate of claim 1, wherein
the porous surface layer is a nonwoven fabric of inorganic fibers.

7. The functional laminate of claim 6, wherein
fibers forming the fiber nonwoven fabric of the porous surface layer has an average fiber diameter of 0.005 to 50 μm.

8. The functional laminate of claim 1, wherein
the resin foamed layer has an average void diameter of 0.04 to 800 μm.

* * * * *